United States Patent [19]
Rehberg et al.

[11] Patent Number: 5,174,804
[45] Date of Patent: Dec. 29, 1992

[54] FERTILIZER/PESTICIDE COMPOSITION AND METHOD OF TREATING PLANTS

[75] Inventors: Bobby E. Rehberg, Winter Haven; William L. Hall, Lakeland, both of Fla.

[73] Assignee: Vigoro Industries, Inc., Fairview Heights, Ill.

[21] Appl. No.: 415,162

[22] Filed: Sep. 29, 1989

[51] Int. Cl.⁵ .................. C05G 9/00; A01N 25/08
[52] U.S. Cl. ................................. 71/3; 71/64.11
[58] Field of Search ......................... 71/3, 64.11

[56] References Cited

U.S. PATENT DOCUMENTS

| | | | |
|---|---|---|---|
| 3,024,098 | 3/1962 | Austin et al. | 71/29 |
| 3,062,637 | 11/1962 | Marples et al. | 71/2.4 |
| 3,365,288 | 1/1963 | Detmer et al. | 71/64 |
| 3,392,007 | 7/1968 | Christoffel et al. | 71/33 |
| 3,576,613 | 4/1971 | Fleming | 71/28 |
| 3,647,416 | 3/1972 | Messman | 71/64.11 |
| 3,870,755 | 3/1975 | Kamo et al. | 260/553 R |
| 3,925,053 | 12/1975 | Kealy | 71/64.11 |
| 4,002,458 | 1/1977 | Hofacker | 71/64 |
| 4,023,955 | 5/1977 | Mueller | 71/64 |
| 4,026,696 | 5/1977 | Young | 71/28 |
| 4,062,890 | 12/1977 | Shank | 260/553 R |
| 4,082,533 | 4/1978 | Wittenbrook et al. | 71/28 |
| 4,142,885 | 3/1979 | Heumann et al. | 71/28 |
| 4,304,589 | 12/1981 | Kamo et al. | 71/64.11 |
| 4,560,400 | 12/1985 | Allan et al. | 71/29 |
| 4,587,358 | 5/1986 | Blouin | 564/3 |
| 4,676,821 | 6/1987 | Gullett et al. | 71/28 |
| 4,704,160 | 11/1987 | McVey et al. | 71/92 |
| 4,711,659 | 12/1987 | Moore | 71/64.12 |
| 4,732,762 | 3/1988 | Sjogren | 424/409 |

OTHER PUBLICATIONS

Mobay, "Technical Information" (Bayleton); Jun. 1984; pp. 1-4.
M. Hamamoto, "Isobutylidene Diurea as a Slow Acting Nitrogen Fertiliser and the Studies in this Field in Japan", Proceeding No. 90.
"Fertilizer with insectide to be made," Green Markets, bearing a date of Mar. 21, 1988.
Mobay Chemical Corporation, Agricultural Chemicals Division, Box 4913, Kansas City, Mo. 64120 "Technical Information," bearing a date of Jun., 1984.
1989 Farm Chemicals Handbook, entry for "Metalaxyl".
The Fertiliser Society, Paper read in London on Jan. 27, 1966.
National Fertilizer Development Center, TVA, Muscle Shoals, Alabama 35660, Product Techsheet "Urea LS ™" (dated Aug., 1987).
National Fertilizer Development Center, TVA, Muscle Shoals, Alabama 35660, Product Techsheet, "Sulfur Coated Area LS" (SCULS ™)(dated Mar. 1988).
National Fertilizer Development Center, TVA, Muscle Shoals, Alabama 35660, Excerpt from TVA Bulletin Y-198, "New Developments in Fertiliser Technology, 16th Demonstration, Oct., 1987".
National Fertilizer Development Center, TVA, Muscle Shoals, Alabama 35660, "Urea LS ™ —A New Fertilizer Product From The National Fertilizer Development Center" (undated).

*Primary Examiner*—Marianne M. Cintins
*Assistant Examiner*—Michael B. Hydorn
*Attorney, Agent, or Firm*—McDermott, Will & Emery

[57] ABSTRACT

Fertilizer/pesticide compositions are disclosed which include a fertilizer component and an active component. The fertilizer component includes plant nutrients, and the active component includes an active material, such as a pesticide, which has a desired effect on plant growth or health when released to the plant over an extended period of time. In a preferred form, the fertilizer component is admixed with the active component and a binder and compressed to form a briquette in which the fertilizer component occludes the active component. The briquette is essentially free of significant quantities of materials which have a high solubility in water. Thus, when a briquette is placed in the soil, it releases nutrients and the active material into the soil over an extended period of time for delivery to the plant. A method of treating plants with such fertilizer/pesticide compositions is also disclosed.

26 Claims, No Drawings

FERTILIZER/PESTICIDE COMPOSITION AND METHOD OF TREATING PLANTS

FIELD OF THE INVENTION

The present invention relates generally to fertilizer/pesticide compositions for plants, and is particularly directed to fertilizer/pesticide compositions which slowly release fertilizer nutrients and an effective dose of pesticide to the environment over a period of one or more years.

BACKGROUND OF THE INVENTION

In the field of forest management, a major problem continually being faced is that of quickly establishing a new and healthy crop of trees after the old crop has been harvested. Three methods of establishing a new crop of trees are currently in use: (1) transplanting small trees from nursery beds, (2) natural seeding from nearby mature trees, and (3) scattering seed by hand or from aircraft. The present invention is primarily concerned with the first method.

A common way to transplant young forest trees from nursery beds is to set them into the soil without application of any fertilizers or chemicals. As the trees mature, tree mortality due to disease is often high, and the growth potential of the trees can be significantly reduced due to lack of nutrients.

By way of example, one disease that causes particular damage among intensively managed pine forests in the southern United States is fusiform rust disease. This disease is caused by the fungus *Cronartium ouercuum* f. sp. *fusiforme*. Spores of this fungus are carried through the air during a "spore-flight season." Upon being infected by the fungus, the tree develops the characteristic fusiform (elliptical or oval) "galls" for which the disease is named. The disease interferes with the growth and development of the trees, particularly the slash and loblolly varieties of pine trees. Unchecked spread of the disease causes a marked reduction in the height and diameter of the trees, thereby resulting in a net decrease in the amount of usable timber which can be harvested per acre of land. Severely infected trees also tend to develop an excessive number of branches or stems, giving them a "bush-like" appearance and reducing their value as a source of timber. In short, the disease is a major obstacle to the proper growth of forest trees.

While the maturing trees are still in nursery beds, it is possible to control the incidence of the disease by repeatedly spraying the trees with a systemic fungicide (such as the fungicide Bayleton ®) at one month intervals during the spore-flight season. However, once the trees are transplanted into forests, it is exceedingly expensive, and therefore impractical, to continue spraying the trees with fungicides. As a result, it is common practice simply to transplant the trees without any further application of chemicals to control the disease. Since the immature trees are particularly susceptible to disease after they are transplanted, they provide a vulnerable target for the fusiform rust fungus. As a result, in some areas the incidence of the disease in slash pines can reach 50% or higher.

Trees that are uninfected by fusiform rust disease by age 5 are likely to grow to maturity for commercial harvest. Accordingly, a need exists for a slow-release pesticide in which the pesticide control agent is designed to have an extended release period so that the seedlings can mature to age 5 without significant infection by the fungus.

It is known to provide slow-release fertilizer material by mixing nitrogen, phosphorus, potassium, and micronutrient sources with inert binding materials or urea formaldehyde resins to retard the generally rapid rate of leaching of fertilizer salts. For example, U.S. Pat. No. 3,925,053 discloses a slow acting fertilizer composition in which a hemihydrate of calcium sulfate is used as a binder to bond the fertilizer materials.

Such bonded fertilizer compositions may also be manufactured in the form of a spike or a briquette. For example, U.S. Pat. No. 3,647,416 discloses a slow-release fertilizer spike comprising a water-soluble urea-formaldehyde resin, a granular filler material, and a binder derived from magnesia and phosphoric acid. The extruded spikes have a high crushing strength. Likewise, U.S. Pat. No. 3,024,098 discloses a fertilizer product produced by preparing a finely divided mass comprising essentially at least one nutrient constituent selected from the group consisting of certain urea-formaldehyde compounds and phosphorus-containing compounds. The mass is then compressed into unitary products of substantially uniform size. The resulting product contains nutrient in a highly concentrated but slowly soluble form which may be placed at the bottom of a planting hole at the time a seedling is transplanted.

Although these products have a high crushing strength, they typically contain some water soluble ingredients which cause them to lose their integrity relatively rapidly when immersed in water. Excessive moisture generated during hard rains may cause accelerated and wasteful consumption and leaching of the fertilizer materials. Soaking rains can cause concentration of plant food salts in the vicinity of the plant roots which may damage the plant.

Greater success is had when relatively insoluble fertilizer materials are formed into briquettes. For example, U.S. Pat. No. 4,304,589 discloses a briquetted fertilizer for forest fertilization which comprises compression molded granular isobutylidene diurea (which is relatively insoluble in water) and heavy mineral oil. The fertilizer is capable of maintaining its fertilizing effect for from 3 to 5 years.

Prior efforts to control the release of pesticides in the soil have centered primarily around methods of encapsulation, dissolution, or incorporation of the active ingredient. Release rate of the pesticide is governed by the coating permeability, dissolution rate of the active ingredient, or the permeability of the carrier (elastomers, polyvinyl chloride, or hydrophobic binders). For example, U.S. Pat. No. 3,062,637 discloses a granular aggregate of an active agricultural ingredient (such as plant nutrients, herbicides, algicides, and/or insecticidal toxicants), a particulate nocolloidal mineral carrier, and a colloidal clay as the binder for the aggregate. These efforts have generally met with limited success, due to uneven or uncontrollable release patterns of the pesticide. In addition, the release rate is often too rapid for the effective long-term control of diseases such as fusiform rust.

Accordingly, it is an object of the present invention to provide a fertilizer/pesticide composition which dissolves gradually in the soil to slowly provide the active ingredient of a desirable pesticide, thereby obviating the need for repeated applications of pesticide to maturing plants.

It is a further object of the present invention to provide a fertilizer/pesticide composition which provides long-term fertilization in addition to pesticide protection, thereby saving labor and enhancing the Potential for plant growth and health.

It is yet a further object of the present invention to provide a fertilizer/pesticide composition which is not toxic to the plant when placed adjacent to the root system and which is, therefore, safe for maturing plants.

It is yet a further object of the present invention to provide a fertilizer/pesticide composition which is simple to apply and safe to workers and the environment.

If is yet a further object of the present invention to provide a fertilizer/pesticide composition which is cost-effective and which may be made by readily available manufacturing methods.

SUMMARY OF THE INVENTION

To accomplish these and other objects, a fertilizer composition is provided which comprises a fertilizer component and an active component. The fertilizer component includes plant nutrients. The active component includes an active material, such as a pesticide, which has a desired effect on plant growth or health when released to the plant over an extended period of time. In a preferred form, the fertilizer component is admixed with the active component and a binder and compressed to form a briquette in which the fertilizer component occludes the active component. Significantly, the briquette is essentially free of significant quantities of materials which have a high solubility in water. Thus, when a briquette is placed in the soil, it releases nutrients and the active material into the soil over an extended period of time.

Such a fertilizer composition can be placed into the soil adjacent to a growing plant to deliver fertilizer and pesticide to the plant over a period of time, thereby providing the plant with nutrients and pesticide for an extended period.

DETAILED DESCRIPTION

The fertilizer/pesticide composition of the present invention preferably takes the form of a briquette or tablet formed of an admixture of nutritive source materials (i.e., fertilizer) and pesticide. The briquette preferably utilizes fertilizer source materials which are sparingly soluble in water as an effective carrier of systemic or localized contact pesticides.

The fertilizer component of the briquette preferably consists of any plant nutrients which are sparingly soluble in water. As used herein, the term "sparingly soluble" includes source materials which, when mixed with an active material (such as a pesticide), will permit the active material to be gradually released into the surrounding soil and thereby provide for continued delivery of the active material over a period of at least one, and preferably two or more, years. Accordingly, this term generally includes plant nutrient source materials which have a low solubility in water, i.e., less than about 1 part in 100.

A presently preferred nitrogen source material is isobutylidene diurea, or IBDU®. (IBDU® is a registered trademark of Vigoro® Industries, Inc.) Other potential nitrogen source materials include oxamide, melamine, and other materials having similar slow-release characteristics. In addition, other fertilizer source materials may be used, including, without limitation, the following: magnesium ammonium phosphate or other metal ammonium phosphates, slag, ammonium metaphosphate, bone products, brucite, calcined phosphate, calcium metaphosphate, calcium phosphate, calcium polyphosphate, cement flue dust, chats, cottonseed extract, crotonylidene diurea, diamido phosphate, dicyanodiamide, dolomite, fused calcium magnesium phosphate, fused tricalcium phosphate, fused phosphate, phosphate rock, gradually efficacious potassium phosphate, potassium silicate, guanylurea, greensand, MgO, magnesium phosphate, monocalcium diammonium pyrophosphate, organiform, oxamidine phosphate, phosphatetraurea, phosphate sand, phosphoryltriamide, polyhalite, potassium polyphosphate, tankage, sludge, sulfate of potash magnesium, triuret, urea formaldehyde, uric acid, and sulfur.

It will be understood that the above fertilizer source materials may be combined in various ways to provide a fertilizer component having suitable amounts of nitrogen (N), phosphorus (P), and potassium (K) components for proper fertilization. A 14-3-3 fertilizer consisting of isobutylidene diurea, dicalcium phosphate (Chemical Abstracts No. 7757-93-9), fused potassium silicate (Chemical Abstracts No. 17573-15-4), and approximately 1% sulfur (Chemical Abstracts No. 7704-34-9, used for control of pH) has been used with success as the fertilizer component of the present invention. (The designation "14-3-3" denotes a fertilizer having a 14% nitrogen component, 3% $P_2O_5$ component, and 3% $K_2O$ component, all percentages being by weight.)

It will be understood, however, that the amounts of these components may be varied based on the particular needs of the plants being fertilized in accordance with common practice. For example, a 16-8-1 blend of fertilizer source materials would be preferred for most forestry applications, while a 14-3-3 blend would generally be preferred for ornamental plants.

The other component of the briquette of the present invention is an active component. The active component includes an active material which has a particular desired effect on plant growth or health when released to a plant over an extended period of time. Such desired effects include, for example, control of pests or diseases, growth control, and growth regulation.

Pesticides are the preferred active material for use in the present invention. As used herein, the term "pesticide" includes any substance or mixture of substances intended for preventing, destroying, repelling, or mitigating any insect, rodents, nematodes, fungi, or weeds, or any other forms of life declared to be pests, and any substance or mixture of substances intended for use as a plant regulator, defoliant, or desiccant. As so defined, the term pesticide is generally synonymous with the term "economic poison" and includes, without limitation, systemic and non-systemic herbicides, algicides, fungicides, insecticidal toxicants, nitrification inhibitors, acaricides, and nematocides. The term pesticide also includes materials of these types which have both systemic and non-systemic activity.

When the briquette is used to control fusiform rust disease (particularly in pine seedlings), the preferred active material is a systemic fungicide marketed by Mobay Chemical Corporation under the trademark Bayleton® (Chemical Abstracts No. 43121-43-3). :The chemical name for Bayleton® is 1-(4-Chlorophenoxy)-3,3-dimethyl-1-(1%-1,2,4,-triazol-1-yl)2-butanone. The structural formula of Bayleton® is:

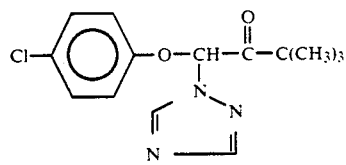

Bayleton ® is known to be an effective systemic fungicide in controlling fusiform rust disease, but requires repeat applications for continuous protection of trees. The fertilizer/pesticide composition of the present invention eliminates the need for repeat applications by allowing the Bayleton ® to pass into the surrounding soil gradually for continued incorporation by a plant or tree over an extended period of time while the plant matures.

In addition to Bayleton ®, any number of commercially available pesticides may be used in practicing the present invention. By way of example, another pesticide which may be used is the fungicide metalaxyl (chemical name: N-(2,6-Dimethylphenyl)-N-(methoxyacetyl)-alanine methyl ester), which has the structural formula 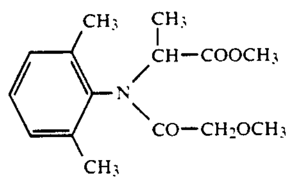 Metalaxyl is available from Ciba-Geigy under the tradename Ridomil ® and is the preferred pesticide for control of soil-borne diseases caused by Pythium (a fungus which causes rotting of the roots) and Phytoohthora.

Other active materials which could be used in practicing the present invention include the pesticide carbofuran (2,3-Dihydro-2,2-dimethyl-7-benzofuranyl methylcarbamate), the insecticide/acaricide Disyston ® (0,0-Diethyl S-[2-(ethylthio)ethyl]phosphorodithiodate), the natural insecticide Myristicin, and plant growth regulators, such as fluorprimidol (sold by Elanco under the tradename Cutlass ®) and garlic extract.

The amount of pesticide used in the briquettes can vary. In general, however, an amount should be used that is sufficient to protect the plant, but not so great that the pesticide becomes toxic to the plant or to the surrounding environment. When Bayleton ® is used as a pesticide for control of fusiform rust in pine seedlings, approximately 200–2000 ppm should be used in a fertilizer/pesticide briquette which is about 17 grams in weight and approximately 40–50 $cm^3$, with about 1000 ppm presently believed to be a preferred amount. It will be understood that different active materials have differing release characteristics. Accordingly, it is possible to vary the composition and amount of the fertilizer component depending upon the release characteristics of the active material and thereby obtain an occlusion which degrades sufficiently slowly so as to release plant nutrients and the active material over an extended period.

When metalaxyl is used as the pesticide for the control of Pythium in small plants (such as poinsettias), approximately 200–5000 ppm should be used in a briquette having a volume of about 20 $cm^3$, with about 2000 ppm being preferred.

In making the briquettes of the present invention, suitable amounts of the fertilizer and active components are preferably mixed together so that the fertilizer component occludes (incorporates in some fashion) the active component. In this manner, the active component is substantially impregnated in the fertilizer component and an occlusion (such as an agglomeration or admixture) of the fertilizer component and the active component is formed. The term "occlusion" is generally intended to include compositions in which the active component is substantially incorporated within the fertilizer component to form a unitary article.

It is preferred that the fertilizer component and the active component be bound in an occlusion by means of a suitable binder. To accomplish this, the fertilizer and active components may be mixed with a binder using conventional mixing apparatus (e.g., a conventional granulator drum). Alternatively, the fertilizer and active components may be mixed separately and the binder may be sprayed onto the molding zone of the briquette molding machine at the time of compression molding. It is preferred, however, that the components be sufficiently mixed so that a homogeneous mixture of fertilizer, active component (e.g., pesticide), and binder is formed prior to molding.

Preferably, the occlusion of the fertilizer and active components takes the form of a compressed briquette or tablet which has been impregnated with a suitable pesticide. In forming such briquettes, conventional manufacturing equipment (e.g., compression molding equipment) and processes are employed. Examples of relative component amounts, processing steps, and conditions which may (but need not necessarily) be used in manufacturing the briquettes can be found in U.S. Pat No. 4,304,589, which is incorporated herein by reference and made a part hereof. However, it should be noted that the amount of moisture indicated as being present in the isobutylidene diurea in U.S. Pat. No. 4,304,589 may be reduced somewhat in practicing the present invention, particularly when a binder is used.

With regard to the composition of the binder, any number of conventional binders may be used in practicing the present invention. Success has been had with binders consisting of a mixture of 1–3% polyvinyl alcohol (PVA—Chemical Abstracts No. 9002-89-5), 1–3% styrene butadiene rubber (SBR -Chemical Abstracts No. 9003-55-8), and 2–6% heavy oil (Chemical Abstracts No. 8002-05-9). It is also contemplated that a binder consisting of 1–3% styrene butadiene rubber, 2–6% heavy oil, and 1–3% lignosulfonate (Chemical Abstracts No. 8062-15-5) could be used with success. (Unless otherwise noted, all percentages herein are by weight.)

The amount of binder used is ordinarily in the range of 1–10% (based on the weight of the fertilizer granules), with about 5–8% being preferred. However, it should be noted that the amount of the binder is not believed to be critical, so long as the resulting briquette retains its shape in the soil for sufficiently long so that the fertilizer/pesticide is released over an extended period, i.e., on the order of at least one, and preferably two or more, years.

The volume of the molded briquette is typically between about 5 and 200 $cm^3$. When the briquettes are being used with tree seedlings, it is believed that the best results may be obtained with greater volume briquettes (on the order of 50 $cm^3$), which release nutrients and pesticide more slowly over a longer period of time. This is because the size and volume of tree seedlings increases significantly over a three to five-year maturation period, and it is desirable to release the nutrients and pesticides more slowly so that they are available to the growing trees throughout the critical growth period. It will also be understood that the size of the briquette required will depend upon the temperature in the surrounding environment. In general, the briquettes tend to have a greater solubility, and therefore degrade more rapidly, in environments with higher prevailing temperatures.

In making the fertilizer composition of the present invention, it is particularly critical that the occlusion of fertilizer and active components be essentially free of significant quantities of materials which have a high solubility in water. In this regard, the occlusion should not include more than about 10% of substances having a solubility in water in excess of about 1 part in 100. It is preferred that the active component be carried by a fertilizer component which dissolves relatively slowly in the ground so that the fertilizer and active components are released to the soil over an extended period and the fertilization and pest control continues for a period in excess of one, and preferably two or more, years.

Although it is preferred that active components having a relatively low solubility in water be used in practicing the present invention, it will be understood that active components which have a high solubility in water may be used if they are present in sufficiently small amounts such that the resulting occlusion has the desired slow-release characteristics. Of course, the fertilizer composition of the present invention can be used in a method of treating plants and, in particular, tree seedlings. In such a method, the fertilizer compositions of the present invention, which may take the form of a fertilizer/pesticide briquette, are placed in the planting hole prior to transplanting the tree seedling. In this way, the briquette is located adjacent to the plant, and preferably in the root zone, so that the fertilizer and active components are incorporated into the plant (in the case of an active material which is systemic), or around the plant roots, over the course of time.

Typically, only one briquette is used per plant; however, depending upon the the size of the briquette and the amount of fertilizer and pesticide contained therein, two or more briquettes could be used. It will also be understood that the briquette(s) could be buried in the soil adjacent to the root system of the plant after the plant has been transplanted.

The following specific examples demonstrate several specific embodiments of the methods and compositions of this invention and illustrate several of the concepts involved:

EXAMPLE 1

A 14-3-3 fertilizer is mixed in a stirring vessel with 150 ppm Bayleton ® (in granular form) and a binder to form a homogeneous mixture. The fertilizer component of the mixture consists of granular isobutylidene diurea (about 0.7 to 2 mm in particle diameter), dicalcium phosphate, fused potassium silicate, and sulfur (approximately 1%). Note that substantially all of the substances comprising the briquette are sparingly soluble in water, such that the briquette is essentially free of significant quantities of highly soluble components. The binder consists of a mixture of 2% polyvinyl alcohol, 2% styrene butadiene rubber, and 4% heavy oil. Approximately 8% of the binder, based on the weight of the fertilizer, is used in formulating the mixture. The mixture obtained is compression molded into a briquette form (34×34×24 mm) using a conventional compression molding machine so that the resulting briquettes have a hardness of at least 2 kg/cm$^2$. (A lubricant may be applied in the molding zone of the molding machine prior to compression molding to prevent the briquettes from sticking to the molding chambers.)

EXAMPLE 2

In 1985, a test was begun on slash pine (*Pinus elliottii* var *elliottii*) in Perry, Fla. The soil in the test area had a generally sandy composition. The following five treatments were used:

1: 14-3-3 fertilizer briquette (including 50 ppm Bayleton ®)
2: 14-3-3 fertilizer briquette (including 100 ppm Bayleton ®)
3 14-3-3 fertilizer briquette (including 150 ppm Bayleton ®)
4 14-3-3 fertilizer briquette with no Bayleton ® (fertilizer control)
5 no fertilizer and no Bayleton ® (control-control)

The briquettes comprising Treatments 1-3 were made generally as set forth in Example 1, although the precise amounts of the materials comprising the binder, and the amount of binder used, may have varied somewhat from the amounts given in Example 1. Treatment 4 was a fertilizer briquette with no added Bayleton ®. Treatment 5 was the conventional treatment for pine seedlings, i.e., no fertilizer and no pesticide were applied.

The briquettes were applied in the following manner: Pine seedlings, approximately 8-12 inches in height, were transplanted using a wedge shovel to prepare a hole. The fertilizer/pesticide briquette was dropped into the hole, and the seedling was then planted directly above the briquette. Each treatment was applied to two, 200 tree plots (10 rows of 20 trees per plot).

Analysis of plant tissue (terminal buds) by gas chromatography was performed one, two, and three years after each treatment. Each year, 10 trees were randomly selected from among the trees in each treatment group. The tissue taken from each of the 10 trees was combined and analyzed. The analysis demonstrated that the systemic fungicide Bayleton ® was supplied to the plant for a period in excess of two years. The actual analysis was as follows:

| Treatment | 1986 Analysis | 1987 Analysis | 1988 Analysis |
|---|---|---|---|
| #1 | 6 ppb | 0.58 ppm | (none detected) |
| #2 | 27 ppb | 0.24 ppm | (none detected) |
| #3 | 157 ppb | 0.34 ppm | (none detected) |
| #4 | 0 ppb | 0 ppm | (none detected) |
| #5 | 0 ppb | 0 ppm | (none detected) |

In addition to tissue analysis, each treatment was monitored for incidence and severity of infection from fusiform rust. The incidence of infection was quantified by (a) randomly selecting a 25 tree subsample from the 400 tree planting used for each treatment, and (b) counting the number of trees in the subsample which evidenced symptoms of fusiform rust disease. The severity of infection was determined by counting the number of fusiform rust galls present on the trees in that same 25 tree subsample. The resulting data for 1988 is reproduced in the table below:

| Treatment | Incidence | Severity |
| --- | --- | --- |
| #1 | 7 | 9 |
| #2 | 2 | 2 |
| #3 | 3 | 3 |
| #4 | 6 | 6 |
| #5 | 4 | 7 |

A further measure of how the disease and nutrients affect the health of the tree is a parameter called Tree Volume. This number is arrived at by the following calculation:

$$D^2H.$$

where D is the tree diameter in cm and H is tree height in cm. The following is a listing of tree volume for each of the above treatments in 1988, which was determined by averaging tree volume across the same 25 tree sub-sample:

| Treatment | Tree Volume |
| --- | --- |
| #1 | 4503 cm$^3$ |
| #2 | 3802.5 cm$^3$ |
| #3 | 3646 cm$^3$ |
| #4 | 3219 cm$^3$ |
| #5 | 3104 cm$^3$ |

EXAMPLE 3

In 1985, a test was begun on Loblolly pine (*Pinus taeda*) in Bainbridge, Ga. The soil in the test area can be generally described as a loamy sand. The five treatments listed in Example 2 were used and the test protocol and application techniques set forth in Example 2 were followed, except that analysis of plant tissue was performed only in 1987 and 1988. Gas chromatographic analysis of plant tissue yielded the following results:

| Treatment | 1987 Analysis | 1988 Analysis |
| --- | --- | --- |
| #1 | 0.69 ppm | (none detected) |
| #2 | 0.41 ppm | (none detected) |
| #3 | 0.62 ppm | (none detected) |
| #4 | 0 ppm | (none detected) |
| #5 | 0 ppm | (none detected) |

Each treatment was monitored for incidence and severity of infection from fusiform rust using the methods set forth in Example 2. The 1988 results are listed below:

| Treatment | Incidence | Severity |
| --- | --- | --- |
| #1 | 4 | 6 |
| #2 | 5 | 6 |
| #3 | 3 | 7 |
| #4 | 9 | 14 |
| #5 | 6 | 13 |

Finally, tree volume was measured in the manner described in Example 2. The following is a listing of tree volume for the above treatments in 1988:

| Treatment | Tree Volume |
| --- | --- |
| #1 | 6197.7 cm$^3$ |
| #2 | 5960.2 cm$^3$ |
| #3 | 6343.1 cm$^3$ |
| #4 | 6862.5 cm$^3$ |
| #5 | 5442.9 cm$^3$ |

From the data set forth in Examples 2 and 3 above, the following tentative conclusions can be drawn:

1. The use of Bayleton ® impregnated fertilizer briquettes is technically feasible and readily available for incorporation into machine-planting or manual planting methods for southern pine seedlings.
2. The timed-release mechanism is effective in steadily introducing small amounts of fertilizer and Bayleton ® in the seedling root zone.
3. Use of the briquette of the invention permits a novel means of fertilizing southern pines, a process which has been shown previously to be beneficial but is not as yet widely practiced due to increased weed competition from surface applications of granular fertilizer.
4. In agreement with previous research, fertilizing southern pines without the use of a systemic fungicide such as Bayleton ® only increased fusiform rust disease incidence and severity. However, the use of Bayleton ®-impregnated fertilizer briquettes at rates of 100 ppm and greater not only significantly increased tree volume but reduced by up to 50% or more fusiform rust disease incidence and severity when contrasted with control-controls.
5. Amounts of Bayleton ® in the above treatments appear to be on the low end for loss reduction and higher rates are warranted. Rates of 1000 ppm and perhaps higher would probably offer more long-lasting control while not inhibiting tree growth. However, further field testing would be needed to test this premise.
6. Recovery of Bayleton ® from slash and loblolly pine terminal bud samples using gas chromatographic analysis have proven the successful release of the fungicide from the fertilizer/insecticide briquette and uptake into pine seedlings. Higher levels of fungicide, i.e., 100 and 150 ppm, have been associated with significantly higher tree volume and lower disease incidence.

EXAMPLE 4

In September 1987, a test was begun on poinsettia plants in Berkeley, Calif. using the fertilizer/pesticide treatments listed below:

1: no fertilizer and no pesticide (infested check control)
2 14-3-3 fertilizer briquette (including 0.20 metalaxyl)
3 14-3-3 fertilizer briquette (including 0.04% metalaxyl)
4 14-3-3 fertilizer briquette (including 0.02% metalaxyl).

Prior to treatment, all soils were innoculated with a water suspension of Pythium fungii. The above four treatments were applied in the following manner. Poinsettia liners were transplanted into 6 inch pots. A layer of soil lined the bottom of the pot. A single 7 gram fertilizer/pesticide briquette was added, the liner and remaining soil were added and packed to the proper consistency. After 90 days of growth under common industry conditions, four indicia of plant health were measured: plant height, bract number, root ball (on a 0-10 scale), and percentage of infected roots. The results are listed in the following table:

| Treatment | Height (in.) | Bract No. | Root Ball | % Infected |
|---|---|---|---|---|
| #1 | 4.1 | 0.8 | 2.7 | 91.0 |
| #2 | 11.9 | 4.5 | 7.8 | 1.0 |
| #3 | 10.7 | 4.2 | 7.2 | 6.1 |
| #4 | 9.1 | 3.6 | 5.9 | 23.4 |

From this data, the following tentative conclusions can be drawn: The use of metalaxyl impregnated fertilizer briquettes significantly reduced infection by Pythium in poinsettia plants and had a positive effect on plant health during 90 days of maturation under commercial growing conditions. In general, higher amounts of metalaxyl had a more profound positive effect on the plants.

EXAMPLE 5

A briquette with a 2-9-9 fertilizer component and a contact and systemic insecticide component is made generally as set forth in Example 1. The following ingredients are used in the percentage amounts indicated:

| | |
|---|---|
| Cotton seed meal | 33.5% |
| Dicalcium phosphate | 22.5% |
| Syngenite | 30.5% |
| Sulfur | 1.0% |
| Binder | 8.0% |
| Myristicin | 4.5% |

These materials are further identified as follows: Cottonseed meal is ground cottonseed, which contains 6% nitrogen, 2.6% $P_2O_5$, and 1.4% potassium. The availability of the components of ground cottonseed in soil depends on the fineness of the grind, with the components of finer grinds being generally more available. Dicalcium phosphate is calcined (heated) phosphate rock, and contains 36% available $P_2O_5$. Chemical catalysts may also be used to produce dicalcium phosphate. Syngenite ($K_2SO_4 \cdot CaSO_4 \cdot H_2O$) is a naturally occurring salt which is sometimes found in combination with other similar potassium salts, all of which can be synthetically produced from other common fertilizer raw materials. Syngenite contains about 28% $K_2O$. The sulfur is free elemental sulfur which is sometimes useful in controlling the pH of the soil, thereby controlling the solubility of the briquette. The binder used in this Example is calcium lignosulfonate, a sticky resin/polymer extracted from the pulp-wood and paper process. Myristicin (5-allyl-1-methoxy-2,3-methylene-dioxybenzene) is an extract from parsnips. This compound is both safe to humans and has well documented insecticidal properties. Its insecticidal effect is both contact and systemic in nature and is active against many common pests, such as Mexican bean beetle, mosquito larvae, pea aphids, spider mites, and vinegar flies. To obtain sufficient activity, it is necessary that the pesticide be present in concentrations of 200 ppm or more. It is calculated that levels this high could be generated using sufficiently concentrated parsnip extract.

It will be noted that the above briquette is made using substantially all naturally occurring materials.

EXAMPLE 6

A briquette with a 12-12-12 fertilizer component and a fungicide component is made generally as set forth in Example 1. The following ingredients are used in the percentage amounts indicated:

| | |
|---|---|
| Melamine | 5.0% |
| Urea formaldehyde | 17.4% |
| Magnesium ammonium phosphate | 30.0% |
| Syngenite | 36.0% |
| Perk ® | 3.3% |
| Binder | 7.8% |
| Metalaxyl | 0.5% |

These materials are further identified as follows:
Melamine (2,4,6-Triamino-s-triazine) is a very slowly soluble form of nitrogen and contains approximately 66% nitrogen. Urea formaldehyde (methylene urea) contains polymers of varying length, the length determining the nitrogen release rate. Urea formaldehyde contains about 38% nitrogen. Magnesium ammonium phosphate is one of many metal ammonium phosphates of limited solubility. It is available commercially as MagAmp ® 7-40-6. Syngenite was described in Example 5 above. Perk ® is a micronutrient formulation distributed by Vigoro Industries, Inc. containing 15% Fe, 5% Mg, 5% S, 3.2% Mn, 2.7% Zn, 0.675% Cu, and 0.002% Mo. This mixture of metal oxides and sulfates forms an extended release micronutrient formula. The binder is a mixture of styrene butadiene rubber, heavy oil and lignosulfonate. Metalaxyl is a systemic fungicide described in detail above.

The above briquette is a high nutrient mixture containing ample $P_2O_5$ and $K_2O$ for flowering, fruit and ornamental plants.

EXAMPLE 7

A briquette with a 32-5-5 fertilizer component and a pesticide component is made generally as set forth in Example 1. The following ingredients are used in the percentage amounts indicated:

| | |
|---|---|
| Melamine | 47.2% |
| Magnesium ammonium phosphate | 12.5% |
| Polyhalite | 28.0% |
| Sulfur | 1.0% |
| Binder | 7.0% |
| Ferric oxide | 3.3% |
| Carbofuran | 1.0% |

These materials are further identified as follows: Melamine and magnesium ammonium phosphate are described in Example 6 above. Polyhalite ($K_2SO_4 \cdot MgSO_4 \cdot 2CaSO_4 \cdot 2H_2O$) is a natural salt having low solubility in water and containing K, Mg, and Ca. The sulfur is described in Example 5 above. The use of sulfur (or some other pH-adjusting substance) is believed to be particularly important when carbofuran (or other similar pesticides) is used as the active material, since it is believed that such substances prevent or reduce breakdown of the carbofuran in the briquette. The binder is the same binder used in Example 6 above. Ferric oxide is 50% Fe that becomes slowly available under acidic conditions. Carbofuran (2,3-dihydro-2,2-dimethyl-7-benzofuranyl methylcarbamate) is a systemic and contact pesticide which controls most soil and foliar pests. It is available commercially from FMC Corp. of Philadelphia, Pa.

The above briquette is a high nitrogen composition which could be used in many applications requiring extra nitrogen, while providing control of most soil and foliar pests.

EXAMPLE 8

A briquette with a 12-6-6 fertilizer component and an insecticide/acaricide component is made generally as set forth in Example 1. The following ingredients are used in the percentage amounts indicated:

| | |
|---|---|
| Oxamide | 35.0% |
| Magnesium ammonium phosphate | 15.0% |
| Potassium silicate | 25.5% |
| Perk ® | 10.5% |
| Binder | 8.0% |
| Sulfur | 1.0% |
| Disyston ® | 5.0% |

These materials are further identified as follows: Oxamide (oxalic acid diamide) is a slowly soluble form of nitrogen which has certain plant growth regulator properties. Magnesium ammonium phosphate was described in Example 6 above. Potassium silicate is of variable composition ($K_2Si_2O_5$ to $K_2Si_3O_7$) and is very slowly soluble in water. It contains about 20% $K_2O$. The Perk ® and binder ingredients were described in Example 6 above. The sulfur ingredient was described in Example 5 above. Disyston ® (0,0-Diethyl S-[2-(ethylthio)ethyl]phosphorodithiodate) is a highly systemic pesticide, particularly effective against sucking insects. It is available commercially from Mobay Chemical.

The above briquette provides a mid-range release and general application briquette for use in vegetable and flower gardens as well as ornamental containers and shrubs.

EXAMPLE 9

A briquette with a 2-9-9 fertilizer component and a plant regulator component is made generally as set forth in Example 1. The following ingredients are used in the percentage amounts indicated:

| | |
|---|---|
| Cotton seed meal | 33.5% |
| Dicalcium phosphate | 22.5% |
| Syngenite | 30.5% |
| Binder | 8.0% |
| Sulfur | 1.0% |
| Humic acid | 4.0% |
| Garlic extract | 0.5% |

These materials are further identified as follows: The cotton seed meal, dicalcium phosphate, syngenite, and sulfur components are described above. The binder is the same binder described in Example 6 above. Humic acid is a mined material including organic deposits which contain varying amounts of the actual acid. This material is used as a growth and quality controlling substance for many plants. Garlic extract is well documented as a natural growth regulater/stimulant.

The above briquette could be used on specialty crops, such as vegetables and ornamentals, where the soil contains limited organics or where special stimulation is desired. As with Example 5, this composition could be made of substantially all natural ingredients.

While the invention has been described in connection with certain present embodiments, those skilled in the art will recognize many modifications to structure, arrangement, portions, elements, materials, components, and steps which can be used in the practice of the invention without departing from the principles thereof.

We claim:

1. A slow-release composition for delivering a pesticide to a plant over an extended period of time comprising:

a slow release fertilizer component including plant nutrients, a pesticidal component, said pesticidal component including a pesticide having a desired effect an plant growth or health when released to a plant over an extended period of time, said fertilizer component occluding said pesticidal component to form an occulusion of said fertilizer component and said pesticidal component, said occulusion having less than about 10% by weight of materials having a solubility in water in excess of about 1 part in 100 so that when said occlusion is placed in the soil said plant nutrients and said pesticide are released to the soil over a period of at least one year.

2. The fertilizer composition of claim 1, in which said occulusion is adapted to release said plant nutrients and said pesticide at rates which extend both fertilization and pest control over a period of two or more years.

3. The fertilizer composition of claim 1, in which the pesticide is a fungicide.

4. The fertilizer composition of claim 3, in which the pesticide is 1-(4-Chlorophenoxy)-3,3-dimethyl-1-(1H-1,2,4, triazol-1-yl)-2-butanone.

5. The fertilizer composition of claim 1, in which said plant nutrients include one or more compounds selected from the group consisting of isobutylidene diurea, crotonylidene diurea, oxamide, melamine, dicalcium phosphate, potassium silicate, calcium magnesium phosphate, and magnesiun ammonium phosphate.

6. The fertilizer composition of claim 1, further including a binder for binding said fertilizer component said said pesticidal component in said occlusion.

7. A slow-release composition for delivering a pesticide to a plant over an extended period of time comprising:

a slow release nitrogen source component, a pesticide having a desired effect on plant growth or health when released to a plant over an extended period of time, said nitrogen source component being combined with said pesticide to form an admixture of said nitrogen source component and said pesticide, said admixture being compressed to form an occlusion of said nitrogen source component and said pesticide, said occlusion having less than about 10% by weight of materials having a solubility in water in excess of about 1 part in 100 so that when said occlusion is placed in the soil said nitrogen source component and said pesticide are released to the soil over a period of at least one year.

8. The fertilizer composition of claim 7, in which said nitrogen source component includes one or more compounds selected from the group consisting of isobutylidene diurea, crotonylidene diurea, oxamide, and melamine.

9. The fertilizer composition of claim 7, wherein said nitrogen source component comprises isobutylidene diurea and in which said occlusion is adapted to release said isobutylidene diurea and said pesticide at rates which extend both fertilization and pest control over a period of two or more years.

10. The fertilizer composition of claim 7, in which the pesticides is a fungicide.

11. The fertilizer composition of claim 10, in which the pesticide is 1-(4-Chlorophenoxy)-3,3-dimethyl-1-(1H-1,2,4,triazol-1-yl)-2-butanone.

12. The fertilizer composition of claim 7, in which said occlusion further comprises one or more compounds selected from the group consisting of dicalcium phosphate, potassium silicate, calcium magnesium phosphate, and magnesium ammonium phosphate.

13. The fertilizer composition of claim 7, further including a binder for binding said nitrogen source component and said pesticide in said occlusion.

14. A method of delivering a pesticide to plants over an extended period of time comprising:
provide a composition, said composition comprising a slow release fertilizer component including plant nutrients, said composition further including a pesticidal component, said pesticidal component including a pesticide having a desired effect on plant growth or health when released to a plant over an extended period of time, said fertilizer component being combined with said pesticidal component to form an occulusion of said fertilizer component and said pesticidal component, said occlusion having less than about 10% by weight of material shaving a solubility in water in excess of about 1 parts in 100 so that when said occlusion is placed in the solid said plant nutrients and said pesticide are released to the soil over a period of at least one year,
placing said composition in the soil adjacent to a plant, whereby said plant nutrients and said pesticide are released into the soil over a period of at least one year.

15. The method of claim 14, in which said composition is adapted to release said plant nutrients and said pesticide at rates which extend both fertilization and pest control over a period of two or more years.

16. The method of claim 14, in which the pesticide is a fungicide.

17. The method of claim 31, in which the pesticide is 1-(4-Chlorophenoxy)-3,3-dimethyl-1-(1H-1,2,4, triazol-1yl)-2-butanone.

18. The method of claim 14, in which said plant nutrients include one or more compounds selected from the group consisting of isobutylidene diurea, crotonylidene diurea, oxamide, melamine, dicalcium phosphate, potassium silicate, calcium magnesium phosphate, and magnesium ammonium phosphate.

19. The method of claim 14, in which said composition further includes a binder for binding said fertilizer component and said pesticidal component in said occlusion.

20. A method of delivering a pesticide to plants over an extended period of time comprising:
providing a composition comprising a slow release nitrogen source and a pesticide having a desired effect on plant growth or health when released to a plant over an extended period of time, said nitrogen source being combined with said pesticide to form an admixture of said nitrogen source and said pesticide, said admixture being compressed to form an occlusion of said nitrogen source and said pesticide, said occlusion having less than about 10% by weight of material shaving a solubility in water in excess of about 1 part in 100 so that when said occlusion is placed in the soil said nitrogen source and said pesticide are released to the soil over a period of at least one year,
placing said composition in the soil adjacent to a plant, whereby said nitrogen source and said pesticide are released into the soil over a period of at least one year.

21. The method of claim 20, in which the nitrogen source is one or more compounds selected from the group consisting of isobutylidene diurea, crotonylidene diurea, oxamide, and melamine.

22. The method of claim 20, in which said occlusion is adapted to release said nitrogen source sand said pesticide at rates which extend both fertilization and pest control over a period of two or more years.

23. The method of claim 20, in which the pesticide is a fungicide.

24. The method of claim 23, in which the pesticide is 1-(4-Chlorophenoxy)-3,3-dimethyl-1-(1H-1,2,4-triazol-1yl)-2-butanone.

25. The method of claim 20, in which said composition further comprises one or more compounds selected from the group consisting of dicalcium phosphate, potassium silicate, calcium magnesium phosphate, and magnesium ammonium phosphate.

26. The method of claim 20, in which said composition further includes a binder for binding said nitrogen source and said active material in said occlusion.

* * * * *